(12) United States Patent
Ryoichi et al.

(10) Patent No.: US 7,740,963 B2
(45) Date of Patent: Jun. 22, 2010

(54) LIQUID FUEL TYPE FUEL CELL SYSTEM AND ITS OPERATING METHOD

(75) Inventors: Okuyama Ryoichi, Takatsuki (JP); Fujita Yukio, Takatsuki (JP); Nomura Eiichi, Shiga (JP)

(73) Assignee: GS Yuasa Corporation, Kyoto (JP)

( * ) Notice: Subject to any disclaimer, the term of this patent is extended or adjusted under 35 U.S.C. 154(b) by 1052 days.

(21) Appl. No.: 10/515,537

(22) PCT Filed: May 26, 2003

(86) PCT No.: PCT/JP03/06559

§ 371 (c)(1),
(2), (4) Date: Nov. 23, 2004

(87) PCT Pub. No.: WO03/100897

PCT Pub. Date: Dec. 4, 2003

(65) Prior Publication Data

US 2005/0244698 A1 Nov. 3, 2005

(30) Foreign Application Priority Data

May 28, 2002 (JP) .............................. 2002-154482

(51) Int. Cl.
*H01M 8/06* (2006.01)
*H01M 8/04* (2006.01)

(52) U.S. Cl. .............................. 429/22; 429/24; 429/34
(58) Field of Classification Search .................. None
See application file for complete search history.

(56) References Cited

U.S. PATENT DOCUMENTS

| 6,358,637 | B1 | 3/2002 | Fuss |
| 6,551,731 | B1* | 4/2003 | Berg et al. ..................... 429/13 |
| 6,884,529 | B2* | 4/2005 | Xie et al. ...................... 429/13 |
| 2002/0025465 | A1* | 2/2002 | Christen et al. ............... 429/24 |

FOREIGN PATENT DOCUMENTS

| JP | 50-64742 | 6/1975 |
| JP | 53-55754 | 10/1976 |
| JP | 184437 | 6/2002 |
| WO | WO 99/44253 | 9/1999 |

* cited by examiner

*Primary Examiner*—John S Maples
(74) *Attorney, Agent, or Firm*—The Webb Law Firm, P.C.

(57) ABSTRACT

A direct methanol type fuel cell system provided with a tank for storing an antifreeze that is injected into at least said unit cell or a cell stack and held in place at the time of stand-by operation of the direct methanol type fuel cell system. At the time of starting operation an oxidant gas is supplied to the cathode side and the antifreeze is removed from the unit cell or the cell stack. After starting operation, the passage between the antifreeze tank and the unit cell or the cell stack is closed and an aqueous solution of methanol is supplied as liquid fuel from a fuel tank to the anode side.

4 Claims, 1 Drawing Sheet

LIQUID FUEL TYPE FUEL CELL SYSTEM AND ITS OPERATING METHOD

FIELD OF THE INVENTION

The present invention relates to a fuel cell system of direct methanol type or the like wherein a methanol aqueous solution as liquid fuel and an oxidant gas can be directly fed to generate electricity and its operating method. To be more specific, the present invention relates to a direct methanol type fuel cell system that is suitable for installation or storage in cold regions and an operating method that can start up the system smoothly.

BACKGROUND OF THE INVENTION

In recent years, much importance has been given to measures to cope with environmental problems and resource problems, and development of fuel cells has been active as one of such measures. In particular, direct methanol type fuel cells, which directly utilize methanol as fuel to generate electricity without reforming or gasification, are simple in structure and can be easily reduced in size and weight. Hence they have been attracting much attention as power sources of portable small-sized electronic equipment, computer power sources and portable power sources.

A direct methanol type fuel cell comprises a cell stack of a plurality of unit cells stacked, the unit cell comprising an anode, a cathode and an electrolyte between them and having means for supplying a methanol aqueous solution as liquid fuel to the anode and means for supplying an oxidant gas such as air to the cathode. In this cell stack, separators, having channels and manifolds for supplying a methanol aqueous solution to the anodes of respective unit cells, supplying an oxidant gas to the cathodes and discharging reaction products formed by electrochemical reactions of the respective unit cells, are interposed between respective unit cells.

To put it more specifically, the channels and manifolds of the separators play roles of supplying a methanol aqueous solution to the anodes, supplying an oxidant gas to the cathodes and discharging carbon dioxide formed from the anodes and water formed from the cathodes.

When a methanol aqueous solution is fed to the anodes of such a direct methanol type fuel cell and an oxidant gas is fed to the cathodes thereof, at the anodes methanol and water will react together to form carbon dioxide, and hydrogen ions and electrons will be emitted. At the cathodes the oxidant gas will take in the hydrogen ions and electrons that permeated the electrolyte to form water. In this way, electrical energy is obtained from an external circuit.

In the above-mentioned direct methanol type fuel cell, it is desirable to raise the concentration of the liquid fuel from the viewpoint of its output characteristics. However, if the concentration is raised, the amount of methanol that permeates (crossover) the electrolyte consisting of proton-conductive polymer membrane will increase. It, therefore, was necessary to set the output characteristics by considering the drop in efficiency due to the increase in the amount of permeation of methanol. In other words, the above-mentioned direct methanol type fuel cell had a characteristic that its output characteristics and efficiency depend heavily on the operating conditions such as service temperature and feeding rates of the fuel and the oxidant gas.

Some direct methanol type fuel cells having a structure wherein a methanol aqueous solution is fed in optimum conditions to the fuel electrode have been known to impose less restraints. For example, Japanese Patent Unexamined Publication Hei 11-510311 (International Publication Number WO97/21256) proposes a structure wherein unused fuel that permeated from the anode to the cathode and carbon dioxide formed at the anode are separated from each other, the unused fuel separated and water formed at the cathode are mixed together, and while monitoring with a concentration sensor to adjust the concentration to an optimum value, methanol or water is added from a pure methanol tank or a water tank by a liquid pump. On the other hand, Japanese Patent Unexamined Publication 2000-21426 discloses a means wherein water and carbon dioxide formed by electrochemical reactions are fed into a mixer to make them react with water stored in advance in the mixer to form carbonic acid, then the carbonic acid and methanol as fuel are mixed together to effectively utilize the reaction products and restrain the drop in the utilization efficiency of the fuel. Furthermore, Japanese Patent Unexamined Publication Hei 9-161810 discloses a means wherein water and carbon dioxide that are formed by electrochemical reactions and unused methanol from which carbon dioxide has been removed are circulated by a pump while they are controlled at an optimal concentration.

In recent years, such direct methanol type fuel cells have been installed or stored as distributed electric power sources indoors and outdoors, and when the site was in a cold region, it was absolutely necessary to ensure its smooth startup. In other Words, it was vital to ensure smooth startup even when the fuel cell was installed in an environment of temperature of $-20°$ C.

SUMMARY OF THE INVENTION

There exists, however, water in an electrolyte consisting of proton conductive polymer membrane such as Nafion (trade mark). Accordingly, when the fuel cells are installed in the above-mentioned environment, that water poses such problems that water freezes to break the electrolyte or the joint between the electrolyte and the anode and the joint between the electrolyte and the cathode are separated. Moreover, it poses problems that when the fuel cells are stored in the above-mentioned environment after operation, water remaining in the cathode, separators on the cathode side or the piping system freezes to break them.

The present invention was made to solve the above-mentioned problems and a liquid fuel type fuel cell system of the invention comprises: one unit cell or one cell stack having a plurality of the unit cells, the unit cell provided with an anode and a cathode opposite to each other and an electrolyte of proton-conductive solid polymer membrane interposed between the anode and the cathode, and the unit cell provided with means for supplying a liquid fuel to the anode and means for supplying an oxidant gas to the cathode; a fuel tank storing a methanol aqueous solution as the liquid fuel to be supplied to the unit cell; and an antifreeze tank storing an antifreeze, the antifreeze injected into and held in at least the cathode side and the anode side of the unit cell or the cell stack upon stand-by operation of the liquid fuel type cell system. Preferably, the concentration of the methanol aqueous solution stored in the fuel tank is kept at 1-8 wt % and the antifreeze stored in the antifreeze tank is a high concentration methanol aqueous solution of 8-60 wt % concentration. This aqueous solution may contain a third component other than water and methanol, and the methanol concentration is determined by the ratio of the methanol content to the total weight of the solution.

Moreover, in a fuel liquid type fuel cell system operating method for operating a liquid fuel type fuel cell system of the invention, the fuel cell system comprises one unit cell or one cell stack having a plurality of the unit cells, the unit cell provided with an anode and a cathode opposite to each other and an electrolyte of proton-conductive solid polymer membrane interposed between the anode and the cathode, and the unit cell provided with means for supplying a liquid fuel to the anode and means for supplying an oxidant gas to the cathode, and a fuel tank storing a methanol aqueous solution as the liquid fuel to be supplied to the unit cell, and the method comprises providing an antifreeze tank storing an antifreeze, a step for injecting and holding the antifreeze in at least the anode side and the cathode of the unit cell or the cell stack upon stand-by operation of the liquid fuel type fuel cell system; a step for supplying the oxidant gas to the cathode side to remove the antifreeze from the cathode side of the unit cell or the cell stack upon starting operation; and a step for closing a passage at least between the antifreeze tank and the cathode side of the unit cell or the cell stack, and supplying the methanol aqueous solution as the liquid fuel from the fuel tank to the anode side upon starting operation.

More specifically, according to the present invention, at the time of stand-by operation of the liquid fuel type fuel cell system, the antifreeze is injected and held in at least the cathode side and the anode side of the unit cell or the cell stack. With this arrangement, even under an ambient temperature of $-20°$ C. or the like, such problems that water present in the electrolyte freezes or water remaining in the cathode, the separator of the cathode side or the piping system freezes can be prevented from occurring.

Moreover, according to the present invention, even under the above-mentioned ambient temperature, the liquid fuel type fuel cell system can be started smoothly, and after the startup, as the methanol aqueous solution as liquid fuel is supplied from the fuel tank, the fuel cell system can operate smoothly.

As described above, the present invention is useful in providing means of a liquid fuel type fuel cell that is suitable for installation in cold regions and an operating method that can smoothly start up the fuel cell, and can contribute to the expansion of their applications.

EMBODIMENT

Figure 1:
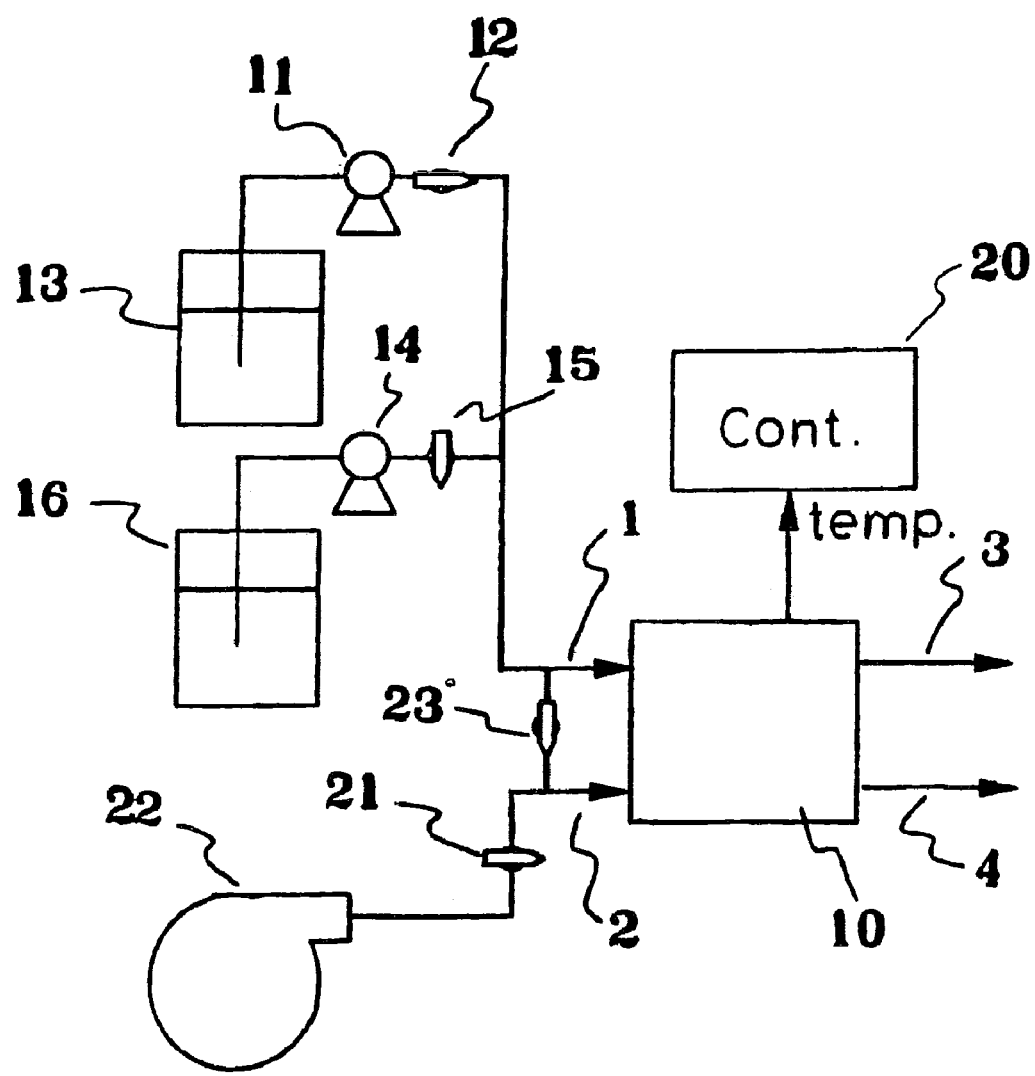
FIG. 1 is a diagram illustrating the structure of the direct methanol type fuel cell system of an embodiment of the present invention.

In the following, the present invention will be described with reference to one embodiment of the invention. FIG. 1 illustrates the structure of the direct methanol type fuel cell system of one embodiment of the present invention. A cell stack 10 comprising a plurality of unit cells stacked is provided with a means 1 for supplying a liquid fuel to the anodes of the unit cells, a means 2 for supplying an oxidant gas to the cathodes of the unit cells, a means 3 for discharging carbon dioxide formed at the anodes, and a means 4 for discharging water formed at the cathodes. The means 1 for supplying the liquid fuel to the anodes of the unit cells is connected, via a pump 14 and a valve 15, to a fuel tank 16 storing a methanol aqueous solution as the fuel liquid and, via a pump 11 and a valve 12, to an antifreeze tank 13 storing an antifreeze. The means 2 for supplying an oxidant gas to the cathodes of the unit cells is connected, via a valve 21, to an air blower 22 for delivering air as the oxidant gas. A valve 23 is provided between the means 1 for supplying the liquid fuel to the anodes of the unit cells and the means 2 for supplying the oxidant gas to the cathodes of the unit cells.

In the unit cell, the anode and the cathode are provided to oppose to each other with an electrolyte consisting of proton-conductive polymer membrane such as Nafion (trade mark) interposed between them. The anode is provided with an anode side separator for supplying a methanol aqueous solution as the liquid fuel, and the cathode is provided with a cathode side separator for supplying air as the oxidant gas. The anode is, for example, a conductive catalyst such as C (carbon)-Pt—Ru mixed with Nafion (trademark) and PTFE (polytetrafluoroethylene). The cathode is, for example, a conductive catalyst such as C (carbon)-Pt mixed with Nafion (trade mark) and PTFE (polytetrafluoroethylene).

In the fuel tank 16, a methanol aqueous solution of which concentration allows stable and efficient operation of the unit cell is stored, and its concentration is desirably 1-8 wt %. In the antifreeze tank 13, is stored an antifreeze which is to be injected into and kept in the cell stack 10 upon the stand-by operation of the direct methanol type fuel cell system, and preferably it is a methanol aqueous solution of which concentration is 8-60 wt %. It should be noted that this antifreeze may be made to contain a third component that improves the effect of the antifreeze, such as ethylene glycol, within an extent that it does not deteriorate the cell characteristics.

During the operation of such a direct methanol type fuel cell system under normal conditions, the valve 21 is opened and air as the oxidant gas is delivered from the air blower 22 to the cathode of the unit cell, and the valve 15 is opened and the methanol aqueous solution as the liquid fuel is supplied by the pump 14 from the fuel tank 16 to the anode of the unit cell. After completion of such operation, if the direct methanol type fuel cell system is to be transferred to a cold region of which ambient temperature is $-5°$ C. or under, or if it is to be installed or stored for operation in a cold region of which ambient temperature is $-5°$ C. or under, the valve 12 is opened and the antifreeze is injected by the pump 11 from the antifreeze tank 13 into and kept in the cell stack 10. In that case, desirably, the antifreeze is injected not only into the cell stack 10 but into channels (piping systems) from the valves 12, 15 to the means 1 for supplying the liquid fuel to the anodes of the unit cells, a channel (piping system) from the means 1, via the valve 23, to the means 2 for supplying the oxidant gas to the cathodes of the unit cells, the means 3 for discharging carbon dioxide formed at the anodes and the means 4 for discharging water formed at the cathodes. After the injection of the antifreeze, the system may be stored with the valve 12 closed. When the antifreeze is to be injected, the valve 15 is closed and the valve 23 is opened. At the time of startup, the valve 23 is closed.

When an antifreeze of which main content is a methanol aqueous solution of 8-60 wt % in concentration is used, even in the above-mentioned cold regions, such events that water present in the electrolyte freezes to damage the electrolyte and that the joints between the electrolyte and the anode and the cathode are separated will not happen. Moreover, even if the system is transferred to the above-mentioned cold region after the system was operated, such events that water remaining at the cathode or the separator of the cathode side or the channel (piping system) freezes to damage them will not take place. At the time of startup, when air as the oxidant gas is delivered to the cathodes of the unit cells, the methanol aqueous solution present in the cathodes as the antifreeze will be removed. Then, as this methanol aqueous solution is at a higher concentration than the usual ones, the temperature of the cell stack 10 will rise due to an exothermic reaction between the methanol aqueous solution and the air, and reactions at the anodes will proceed rapidly. Accordingly, the system can shift to a stable state of operation early. Furthermore, as no substance that degrades the unit cells or the cell stack 10 is contained, no degradation will take place during the standby operation in cold regions.

When the above-mentioned direct methanol type fuel cell system reaches a state of stable operation, the valve 12 is closed and the pump 11 is stopped to terminate the delivery of the antifreeze from the antifreeze tank 13 to the cell stack 10. Then the valve 15 is opened and the pump 14 is operated to deliver the methanol aqueous solution as the liquid fuel to the cell stack 10. In this way, permeation (crossover) of methanol during the operation can be reduced, and efficient operation can be made continuously.

In the direct methanol type fuel cell system illustrated in FIG. 1, the cell stack 10 is a plurality of unit cells stacked together, but in place of this cell stack 10, a unit cell may be used.

Next, as to the concentration of, for example, the methanol aqueous solution stored in the antifreeze tank 13, it should be about 8 wt % or over when the ambient temperature is around −5° C., about 25 wt % or over when the ambient temperature is around −20° C., and about 40 wt % or over when the ambient temperature is around −40° C. However, if the concentration is 60 wt % or over, there is a risk of catching fire, hence it is better to set the upper limit of the concentration at 60 wt %.

As to the concentration of the methanol aqueous solution to be stored in the fuel tank 16, the decrease in the efficiency with the increase in the amount of permeation of methanol should be taken into consideration, and it is better to set the concentration in the range of 1-8 wt %, which is a range in which good output characteristics can be obtained.

When the antifreeze to be stored in the antifreeze tank 13 is a methanol aqueous solution, a concentration sensor may be used to detect a decrease in the concentration of the methanol aqueous solution in the fuel tank 16 due to electric discharge below a predetermined value. Then a piping system that is not illustrated may be provided as follows: a methanol aqueous solution of which concentration is 8-60 wt % is fed into the fuel tank 16, the concentration of the methanol aqueous solution in the fuel tank 16 is controlled to attain a predetermined value, and when it reaches the predetermined value, the supply of the former will be stopped.

Preferably, a controller 20 is provided to control various valves and pumps, and temperature sensors that are not illustrated are provided on the cell stack 10, etc. to determine the cell temperature, and the controller 20 controls the timing of lowering the methanol concentration from that of the antifreeze to that of the normal methanol-water fuel. For example, when the stack temperature or the exhaust fuel temperature reaches 40° C., it may be judged that the heat generation in the cell is well in advance and the system has been stabilized, and the supply of the antifreeze may be cut off and switched to the supply of a normal low-concentration methanol-water fuel. Whether an antifreeze is to be injected or not may be manually inputted into the controller, but, two shutdown modes, namely, long-term storage and temporary suspension, may be provided, and it may be so arranged that in the long-term storage mode, an antifreeze is injected uniformly. In the antifreeze tank, a high-concentration methanol, for example, a 60 wt % methanol aqueous solution or the like may be stored, and it may be diluted with the fuel of the fuel tank to obtain an antifreeze of the desired methanol concentration.

The embodiment was described by using a methanol-water fuel as an example, however, other fuels such as isopropanol-water and dimethyl ether-water may be used.

The invention claimed is:

1. A liquid fuel type fuel cell system comprising:
   a unit cell or a cell stack having a plurality of the unit cells, the unit cell or cell stack provided with an anode and a cathode opposite to each other and an electrolyte of proton-conductive solid polymer membrane interposed between the anode and the cathode, and the unit cell or cell stack provided with means for supplying a liquid fuel to the anode and means for supplying an oxidant gas to the cathode;
   a fuel tank storing a methanol aqueous solution having a methanol concentration of 1-8 wt % as the liquid fuel to be supplied to the unit cell or cell stack;
   an antifreeze tank storing a high concentration methanol aqueous solution having a methanol concentration of 8-60 wt % as antifreeze, wherein the methanol concentration of the antifreeze stored in the antifreeze tank is greater than the methanol concentration of the methanol aqueous solution stored in the fuel tank; and
   means for injecting said antifreeze into and holding said antifreeze in at least said cathode side and said anode side of said unit cell or said cell stack upon stand-by operation of the liquid fuel type fuel cell system.

2. The liquid fuel type fuel cell system according to claim 1, further comprising means for supplying an oxidant gas to the cathode side to remove the antifreeze from the cathode side of the unit cell or the cell stack while closing a passage at least between the antifreeze tank and the cathode side of the unit cell or the cell stack, upon starting operation.

3. A liquid fuel type fuel cell system comprising a unit cell or a cell stack having a plurality of the unit cells, the unit cell or cell stack provided with:
   an anode and a cathode opposite to each other;
   an electrolyte of proton-conductive solid polymer membrane interposed between the anode and the cathode;
   a fuel tank storing a methanol aqueous solution having a methanol concentration of 1-8 wt % as a liquid fuel to be supplied to the unit cell or cell stack;
   a fuel supply valve positioned between the fuel tank and the unit cell or cell stack for supplying the liquid fuel to the anode;
   an air blower;
   an oxidant gas supply valve positioned between the air blower and the unit cell or cell stack for supplying an oxidant gas to the cathode;
   an antifreeze tank storing a high concentration methanol aqueous solution having a methanol concentration of 8-60 wt % as antifreeze, wherein the methanol concentration of the antifreeze stored in the antifreeze tank is greater than the methanol concentration of the methanol aqueous solution stored in the fuel tank;
   an antifreeze supply valve positioned between the antifreeze tank and the unit cell or cell stack; and
   a controller adapted to control the fuel supply valve, the oxidant gas supply valve, the antifreeze supply valve, and the air blower,
   wherein, upon stand-by operation of the liquid fuel type fuel cell system, the controller is adapted to close the fuel supply valve and the oxidant gas supply valve and open the antifreeze supply valve for injecting the antifreeze into at least the cathode side and the anode side of the unit cell or the cell stack, and wherein the controller is adapted to, after antifreeze has been injected into the unit cell or cell stack upon standby operation, close the antifreeze supply valve, thereby retaining antifreeze in at least the cathode side and the anode side of the unit cell or the cell stack with the unit cell or cell stack isolated from the supply of oxidant gas, the fuel tank, and the antifreeze tank.

4. The liquid fuel type fuel cell system according to claim 3, further comprising means for supplying an oxidant gas to the cathode side to remove the antifreeze from the cathode side of the unit cell or the cell stack while closing a passage at least between the antifreeze tank and the cathode side of the unit cell or the cell stack, upon starting operation.

* * * * *